C. H. TAYLOR & B. B. NEUTEBOOM.
DRIVE WHEEL CONSTRUCTION FOR MOTOR VEHICLES.
APPLICATION FILED MAR. 8, 1915.
1,226,276. Patented May 15, 19⟨⟩
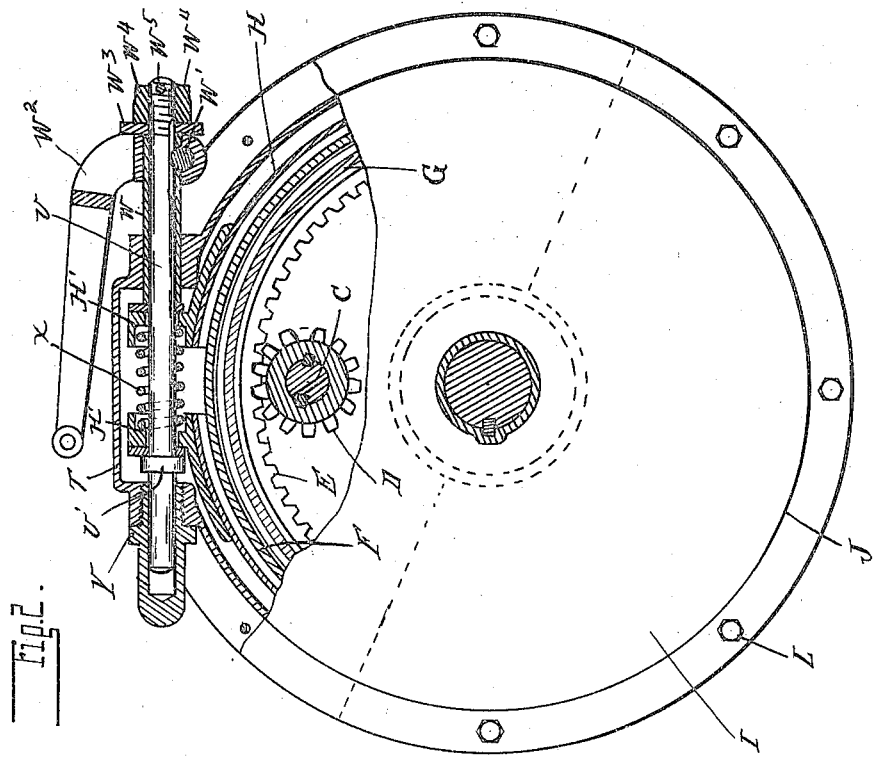
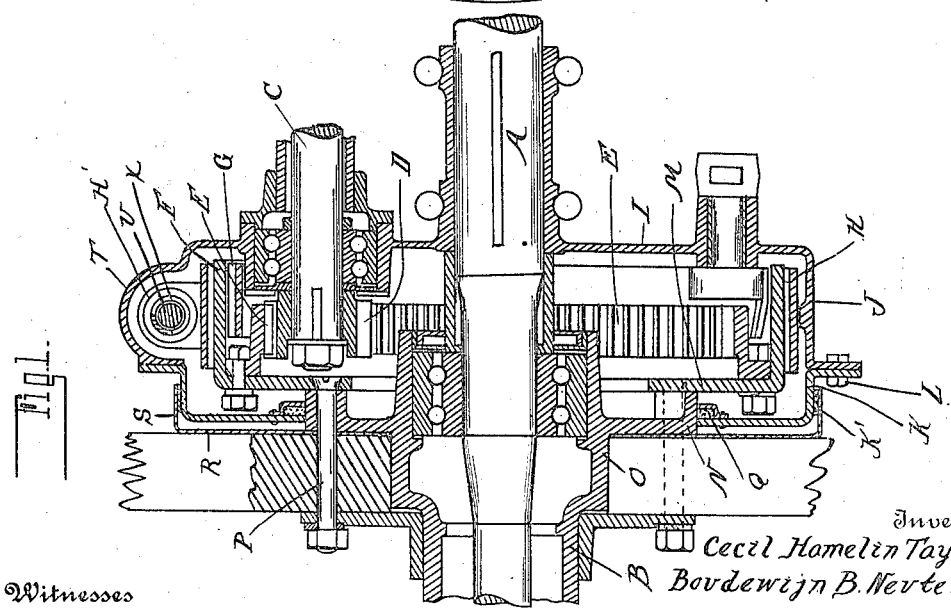
Inventors
Cecil Hamelin Taylor &
Boudewijn B. Neuteboom
By Whittemore Hulbert & Whittemore
Attorneys

UNITED STATES PATENT OFFICE.

CECIL HAMELIN TAYLOR AND BOUDEWIJN B. NEUTEBOOM, OF DETROIT, MICHIGAN.

DRIVE-WHEEL CONSTRUCTION FOR MOTOR-VEHICLES.

1,226,276.   Specification of Letters Patent.   Patented May 15, 1917.

Application filed March 8, 1915.   Serial No. 12,953.

*To all whom it may concern:*

Be it known that we, CECIL HAMELIN TAYLOR and BOUDEWIJN B. NEUTEBOOM, a citizen of the United States of America, and a subject of the Queen of the Netherlands, respectively, residing at Detroit, in the county of Wayne and State of Michigan, have invented certain new and useful Improvements in Drive-Wheel Construction for Motor-Vehicles, of which the following is a specification, reference being had therein to the accompanying drawings.

The invention relates to motor vehicles of that type provided with an eccentric drive mechanism for the wheels, and it is the object of the invention, first, to obtain a construction in which the mechanism is tightly housed and the lubricant retained; further, to provide a construction of brake mechanism which may be placed in the oil-tight housing and is operable from without the same.

In the drawings:

Figure 1 is a longitudinal section in the plane of the axle; and

Fig. 2 is a cross section though the housing and drive mechanism, showing also the application of the brake mechanism.

A is the axle, B is the wheel journaled thereon and C is the drive shaft which is eccentric to the axis of the wheel, being arranged parallel to the axle A and having mounted at its outer end the pinion D for engaging an annular rack E mounted upon the wheel. There is also provided a brake-drum F surrounding the rack E, adapted for coöperation with internal and external brakes G and H mounted upon a brake-head I on the axle A.

To provide an oil-tight and dust-proof casing for the mechanism within the drum F, we have devised the following construction: J is a flange, preferably integral with the brake-head I, which surrounds the brake-drum and brake mechanism therefor. K is an inwardly-extending flange which is secured by bolts L or other suitable securing means to the flange J and passes between the brake-drum F and the wheel. The flange K may be split in two halves for dismounting without disassembling the hub. To permit of this arrangement the brake-drum F is secured to the wheel by an inwardly-extending web portion M which engages an annular flange N on the wheel hub O and is secured thereto by bolts P.

The flange N acts as a spacer for separating the web M from the spokes of the wheel and this provides sufficient clearance for the flange K. Packing material, such as Q, may be placed between the inner edge of the flange K and the periphery of the ring N, and a mud-guard may also be provided, which as shown consists of a sheet metal disk R clamped between the ring N and the spokes, and having at its periphery an outwardly-extending flange S, which overlaps the cylindrical portion K' on the flange K. Thus dust or mud is prevented from falling between the spokes and the flange K and finding access to the joint of the housing.

With the construction as thus far described, it is evident that the lubricant within the housing is prevented from leaking out, as the centrifugal action will tend to throw it to the periphery, while the joint between the housing and the ring N is of a lesser radius. This arrangement will, however, interfere with the usual construction of brake-operating mechanism as applied to the external brake for the drum F. We have therefore provided a special construction of operating mechanism which is as follows:

T is an outward extension of the member J, which forms a recess for receiving the outwardly-extending lugs H' of the external brake-strap H. U is a rod passing through alined apertures in the lugs H', and also passing outward through the walls of the extension T. U' is a collar on the rod U which bears against one of the lugs H', and W is a sleeve upon the rod U which bears against the opposite lug. This sleeve also passes outward through the wall of the casing, and at its outer end is connected by a pivot W' with a lever W², having a cam portion bearing against a collar W³ upon the rod U. This collar is secured by a nut W⁴ engaging a threaded portion of the rod, and locked in different positions of adjustment by suitable means, such as a cotter pin W⁵. X is a spring sleeved upon the rod U intermediate the lugs H' and acting to separate these lugs. Y is a bearing for the rod U in the opposite wall of the extension T and which also forms a cap for closing the aperture through which the collar U' on the rod is entered into the casing.

With the construction just described, when the lever W' is actuated in the direction of the arrow, it will effect a relative movement of the rod U and sleeve W, which will adjust the lugs H' toward each other against the tension of the spring X. This will tighten the brake-band H upon the drum F, and at the same time perfect freedom of longitudinal adjustment is provided for the rod U in its bearings in the housing, so that the brake-strap may center itself in relation to the drum and bear uniformly thereupon. In other words, the construction is one in which the brake-setting mechanism floats and is free to adjust itself in relation to the drum. Upon releasing the pull upon the lever W³, the spring X will separate the lugs H', thereby releasing the brake. In which ever direction the brake-drum may be turning when the brake is set, the band will exert a wrap-up action upon the drum, as the abutment for carrying the brake-band torque is independent of the operating mechanism.

It will be noted that the construction of brake mechanism above described does not interfere with the oil-tight character of the housing,—for the relatively-movable sleeve W and rod U are coaxially arranged and pass outward through the same aperture in the case.

What we claim as our invention is:—

1. The combination with an axle and a wheel journaled thereon, of a non-concentric drive mechanism for said wheel including a gear mounted upon the wheel and a coöperating pinion, a stationary housing for said drive mechanism having a portion extending from said axle on one side of said gear, and a detachable portion of said portion of said housing extending inward upon the opposite side of said gear to a point nearer the wheel axis, and a mud-guard member adjacent said detachable portion having a portion bearing on a peripheral portion thereof.

2. The combination with an axle and a wheel journaled thereon, of a non-concentric drive mechanism for said wheel, including an annular rack secured to the wheel and a coöperating pinion, a stationary housing mounted on said axle and extending outward therefrom on one side of said annular rack and about the periphery thereof, a detachable complementary portion of said housing extending from said peripheral portion inward on the opposite side of said rack to a point nearer the wheel axis, and a member clamped to said wheel and having sealing contact with a portion of the periphery of said detachable complementary portion.

3. The combination with an axle and a wheel journaled thereon, of a non-concentric drive mechanism, comprising an annular rack having an inwardly-extending securing flange mounted upon said wheel and spaced from the spokes thereof, a coöperating pinion for said rack, and a stationary housing for said drive mechanism mounted upon said axle, having a portion extending outward on one side of said rack and about the periphery thereof and a detachable portion extending inward upon the opposite side of said rack between said securing flange and the spokes of the wheel and to a point nearer the axis of said wheel, and a member secured to the spokes of the wheel, having a flange bearing upon a peripheral portion of the detachable portion.

4. The combination with an axle and a wheel journaled thereon, of a non-concentric drive mechanism for said wheel, comprising an annular rack and a coöperating pinion, a brake-drum surrounding said annular rack and forming a mounting therefor and having an inwardly-extending portion secured to the hub of the wheel, a stationary housing mounted on said axle inclosing said non-concentric drive mechanism and brake-drum, having an inwardly-extending portion between the securing portion of said brake-drum and the wheel, a floating brake mechanism for coöperation with said drum inclosed within said housing, and means for actuating said brake mechanism from without the housing.

5. The combination with an axle and a wheel journaled thereon, of a non-concentric drive mechanism for said wheel, a brake-drum surrounding said non-concentric drive mechanism, a stationary housing inclosing said non-concentric drive mechanism and brake-drum, a brake-strap for coöperating with said brake-drum, and actuating members for the opposite ends of said brake-strap, having coaxially arranged portions extending outward through said housing.

6. The combination with an axle and a wheel journaled thereon, of a non-concentric drive mechanism for said wheel, a brake-drum surrounding said non-concentric drive mechanism, a stationary housing for said non-concentric drive mechanism and brake-drum, a brake-strap surrounding said brake-drum and having outwardly-extending lugs at its opposite ends engaging a recess in said housing, an actuating rod for one end of said brake-strap passing through the lug thereof and outward from said housing a sleeve surrounding said rod for engaging the opposite lugs of the brake-strap, a spring sleeved on said rod intermediate said lug for expanding the strap, and mechanism without said housing for relatively moving said rod and sleeve while permitting freedom for joint movement thereof.

7. The combination with an axle and a wheel journaled thereon, of means for driving said wheel, a brake-drum upon said wheel surrounding said driving means, a brake-strap surrounding said drum, a housing surrounding said brake-strap, providing an anchor bearing for either end of the strap, and means operable from without said housing for drawing the ends of said brake-strap toward each other without regard to which end of the strap is engaged with the anchor bearing.

8. The combination with an axle and a wheel journaled thereon, a brake-drum secured to said wheel, a brake strap for coöperating with said brake-drum, actuating members for the opposite ends of said brake-strap, and means for relatively moving said actuating members while permitting freedom for joint movement thereof.

9. The combination with an axle and a wheel journaled thereon, of a non-concentric drive mechanism for said wheel, a stationary housing for said drive mechanism including an annular portion surrounding said gear and extending inward beyond said gear, and a revoluble member secured to said wheel and having a substantially sealing contact with said stationary housing.

In testimony whereof we affix our signatures in presence of two witnesses.

CECIL HAMELIN TAYLOR.
BOUDEWIJN B. NEUTEBOOM.

Witnesses:
JAMES P. BARRY,
HENRIETTE E. BOWMAN.

Copies of this patent may be obtained for five cents each, by addressing the "Commissioner of Patents, Washington, D. C."